3,312,537
APERTURED BODY FOR THE PASSAGE OF
MOLTEN GLASS
Ronald Colgan Jewell, Ormskirk, England, assignor to Fibreglass Limited, St. Helens, England, a British company
No Drawing. Filed Sept. 15, 1964, Ser. No. 396,757
Claims priority, application Great Britain, Sept. 16, 1963, 36,296/63
2 Claims. (Cl. 29—183.5)

This invention relates to an apertured body for the passage of molten thermoplastic mineral material, for example glass, and more particularly to a rotary, centrifugal spinner of the kind well known in the production of glass fibres, which kind of spinner has rows of small holes in its periphery through which molten glass is forced centrifugally, to produce very fine streams of glass to form the glass fibres. A spinner of this kind operates under very arduous conditions; it is subject to powerful centrifugal force; it is subject to continuous great heat; and it is subject to attack by molten glass.

An object of this invention is to provide an improved apertured body for the passage of molten glass, and particularly an improved spinner of the kind referred to.

According to this invention an apertured body for the passage of molten glass is made of an alloy having the following composition by volume, nickel; 96 to 98%, thorium oxide; 2 to 4%, and unavoidable impurities. The preferred content of thorium oxide is 2½% by volume. This alloy is known as thoriated nickel; it is an alloy of thorium oxide with pure nickel; it is produced by the normal technique of powder metallurgy; and it is stronger than pure nickel at the high temperatures encountered in glass fibre production. The alloy melts at 1453° C. and is thermally stable, not crystallising up to its melting point. It has been found that this alloy is very resistant to attack by the molten glass used in glass fibre production. Because of its thermal stability it has good mechanical properties at high temperature (say of the order of 1300° C.). It also has good resistance to thermal shock and impact at high temperature.

In accordance with a feature of this invention the resistance to oxidation of an apertured body or spinner of thoriated nickel can be improved if it has a surface layer of chromium. This can be produced by subjecting a body or spinner, made in accordance with the invention, to a chromium diffusion treatment, in which the body or spinner is packed in a chromium salt. The latter is then vapourised and chromium penetrates into the metal of the body or spinner to form a surface layer or penetration whose thickness may be several thousands of an inch, say up to five thousandths of an inch. The chromium may be applied to all or part of the surface of the body or spinner.

The invention also includes a method of making an apertured body for the passage of molten thermoplastic mineral material, for example glass, comprising the steps of forming the body of an alloy having the volumetric composition of 97½% nickel, 2½% thorium oxide and unavoidable impurities; and treating the body by chromium diffusion to provide a surface layer thereon of chromium of up to five thousandths of an inch in thickness.

It is considered that a rotary, centrifugal spinner, made in accordance with the invention, can be operated at a higher temperature than has previously been possible.

What I claim is:
1. A rotary centrifugal spinner for the production of mineral fibres, for example glass fibres, made of an alloy consisting essentially of the volumetric composition: nickel of about 97½%; thorium oxide of about 2½%; and a trace amount of impurities; the spinner having a surface layer of chromium of a thickness not greater than five thousandths of an inch.

2. An apertured rotary body for centrifugally spinning fibres from molten thermoplastic mineral material, for example glass fibres, said body being of any alloy consisting essentially of the following volumetric composition: nickel in the range of from about 96% to about 98%; thorium oxide in the range of from about 2% to about 4%; and impurities in the range of from about 0% to about 2%; a portion of said body having a surface layer of chromium, said surface layer having a thickness of less than five thousandths of an inch, said surface layer extending from the exterior surface of said body inwardly to a diffuse boundary, and said surface layer having a volumetric composition of about 100% chromium adjacent to said exterior surface.

References Cited by the Examiner
UNITED STATES PATENTS

| | | | |
|---|---|---|---|
| 2,412,977 | 12/1946 | Eskin | 75—170 X |
| 2,859,158 | 11/1958 | Schaer. | |
| 2,947,114 | 9/1960 | Hill. | |
| 3,044,155 | 7/1962 | Robinson | 29—183.5 X |
| 3,061,462 | 10/1962 | Acton. | |
| 3,085,876 | 4/1963 | Alexander | 29—182.5 |
| 3,087,234 | 4/1963 | Alexander | 75—170 X |
| 3,218,135 | 11/1965 | Alexander | 29—182.5 |

HYLAND BIZOT, *Primary Examiner.*